Patented July 11, 1950

2,514,363

UNITED STATES PATENT OFFICE 2,514,363

ALKYL PHENOL-HYDROXYLAMINE MIXTURES AS POLYMERIZATION SHORT-STOPS

Fred W. Banes and Erving Arundale, Westfield, N. J., assignors to Standard Oil Development Company, a corporation of Delaware No Drawing. Application October 31, 1945, Serial No. 625,965

14 Claims. (Cl. 260—83.3)

This invention pertains to improvements in synthetic rubber latices such as are obtained by polymerization of conjugated diolefins or mixtures of conjugated diolefins with other copolymerizable materials and particularly to short-stopping the emulsion polymerization reaction and stabilizing the resultant latices against degradation during the stripping and/or storage of said latices.

In the so-called Buna manufacture or emulsion polymerization, conjugated diolefins with or without other comonomers such as styrene, acrylonitrile, methyl vinyl ketone and the like which are copolymerizable with conjugated diolefins in aqueous emulsion are emulsified in an aqueous medium, the necessary catalysts, polymerization modifiers, etc., added and the mixture heated with rapid agitation under pressure in suitable reactors to effect polymerization to the desired degree. The rubbery polymer is obtained in the form of a latex which may be used as such, concentrated by creaming or subjected to coagulation in order to recover the polymer in solid or dry form.

In actual operation it is found that rubber of optimum quality is obtained if the polymerization is not allowed to exceed 70 to 80% conversion of the monomers. Above this range the rubber loses its ease of processing, becomes insoluble in its raw state and yields vulcanizates of inferior properties. In order to avoid the effects of the monomers themselves or low polymers thereof such as dimers and trimers on the final product and also for reasons of economy, it is necessary to remove unreacted monomers from the latex. This is usually done by stripping the latex under reduced pressure with or without the aid of heat and/or a stripping agent such as steam or inert gas. Inasmuch as the stripping conditions are usually as severe as or perhaps more severe than the actual polymerization conditions it is necessary to "short-stop" the system so as to prevent further polymerization of the monomers and to prevent inter-polymer reaction, i. e. cross-linking of polymer chains to produce insolubility and a general deterioration of rubber quality.

While it is customary in the rubber industry to stabilize gum rubber by milling anti-oxidants or age resisters, such as phenyl-beta naphthylamine into it, this type of material will not serve as a latex short-stop because of its water insolubility and general lack of activity under the conditions existent in emulsion polymer latices. It is therefore necessary to protect the latex rubber from deterioration during the stripping, handling and storage by the use of other materials. Substances which have been used in the past for this purpose have generally been of the reducing agent type which possess at least some solubility in water. Examples of this class of short-stops are hydroquinone, hydroxylamine, sodium sulfide, sodium sulfite and sodium hyposulfite ($Na_2S_2O_4$). However, most of these compounds possess marked disadvantages of one type or another. For example, hydroquinone is quite effective as a short-stop but it discolors the latex and the recovered gum rubber very badly. Sodium sulfide, on the other hand, does not discolor the latex or the gum rubber but does give rise to traces of hydrogen sulfide which are stripped out with the unreacted monomers thereby poisoning them for subsequent polymerizations. The inorganic reducing agents have the further disadvantage that they fail, in general, to inhibit cross-linking of polymer chains and therefore yield products of high gel content.

It is the object of this invention to provide the art with a novel short-stop for emulsion polymerization reaction systems.

It is also the object of this invention to provide short-stops for emulsion polymerization reaction systems which do not discolor the polymer latices or the polymer itself and which effectively inhibit the cross-linking of the polymer chains.

These and other objects will appear more clearly from the detailed specification and claims which follow.

We have now found that the combined use of hydroxylamine and dialkylated o- or p-cresols show good short-stopping and stabilization behavior, that results are obtained with this combination which are not obtainable with the individual agents and that the results obtained with the combination are more than the mere sum of the effects of the individual agents. This combination of agents is particularly desirable since it is not only effective in short-stopping and stabilizing the latex but also it accomplishes this result without appreciably discoloring the latex after passing through such finishing operations as stripping and prolonged storage.

The use of a combination of hydroxylamine and dialkylated o- or p-cresol in accordance with the present invention is especially useful in producing creamed latex of light color and good storage stability. In this case any residual water-soluble short-stopper would be transferred to the serum (the low solids component of the creaming mixture which constitutes about three fourths of the volume of the original latex) and hence would not offer any resistance to further polymerization of the latex by active polymer segments or by oxidation. However, the presence of an oil soluble stabilizer, although of less short-stopping potency than the hydroxylamine, would continue to offer a stabilizing effect on the creamed latex, since it would separate for the most part into that phase during the creaming operations. This procedure not only permits production of a light colored creamed latex but also one of sufficient stability to permit long storage even in the absence of antioxidants without serious degradation in product quality.

The specific combination of short-stopping agents contemplated consists of hydroxylamine and acid addition salts thereof such as hydroxylamine hydrochloride and dialkyl derivatives of o- and p-cresols corresponding to the general formula

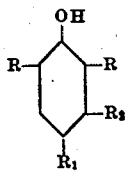

wherein each R stands for an alkyl group of from 1 to 5 carbon atoms and $R_1$ stands for methyl when $R_2$ stands for hydrogen and $R_1$ stands for hydrogen when $R_2$ stands for methyl. Specific compounds contemplated include materials such as ditertiary butyl cresols, di-tertiary amyl cresol, 2,4,6 trimethyl phenol, 2,3-dimethyl-6-tertiary butyl phenol, 2,6 diethyl-4-methyl phenol and the like. The ditertiary butyl cresol may be readily prepared for example, by bubbling isobutylene through para cresol containing a trace (0.1 to 2%) of an acid type catalyst such as sulfuric, cresol-sulfonic acid, etc., or other suitable type of alkylation catalyst at a temperature of about 50–60° C., until about two molar equivalents of isobutylene have been absorbed. To this mixture is then added sufficient base such as $Ba(OH)_2$, $CaCO_3$, NaOH, etc. to neutralize the acid catalyst and prevent subsequent dealkylation. The mixture is then subjected to distillation under reduced pressure to remove isobutylene, isobutylene polymers, unreacted cresol, etc. The residue containing principally dibutylated cresol can be further purified by vacuum distillation (about 150° C. at 25 mm. Hg) or by recrystallization from alcohol or other suitable solvent to yield a crystalline material of about 68–69° C. melting point. Instead of using para cresol, one may also use ortho or meta cresol or other phenols and instead of isobutylene one may use other isoolefins such as isoamylene and the like. The preparation of alkylated phenols is described in some detail in the article entitled "Alkylated Cresols from Refinery Gases" by Menerich in Industrial and Engineering Chemistry, vol. 35, page 265 (1943).

The mixture of short-stoppers contemplated by the present invention is applicable to synthetic rubber latices, which are prepared, as is well known by the polymerization in aqueous emulsion, of conjugated diolefins such as butadiene-1,3, isoprene, piperylene, dimethyl butadiene, methyl pentadiene and the like taken singly or in combination and in admixture with other polymerizable compounds such as styrene, alpha methyl styrene, para methyl styrene, alpha methyl para methyl styrene, halogenated styrenes such as chloro- or bromo-styrenes, acrylonitrile, methacrylonitrile, acrylic- and methacrylic acid esters such as methyl acrylate and methyl methacrylate, fumaric acid esters such as ethyl fumarate and unsaturated ketones such as methyl vinyl ketone and methyl isopropenyl ketone and also to resin latices prepared by polymerizing monoolefinic materials such as styrene, methyl methacrylate, methyl isopropenyl ketone and the like in aqueous emulsion alone or in admixture with minor amounts of conjugated diolefins of 4 to 6 carbon atoms per molecule. This invention is also applicable to these latices before, during or after creaming thereof as described in application Serial No. 556,659 filed September 30, 1944, now U. S. Patent 2,444,801, by E. Arundale. These latices will be referred to hereinafter as synthetic latices or synthetic rubber latices and are not to be confused with any artificial latices prepared by dispersing solid polymerizates whether of natural or artificial origin in water.

The synthetic latices which are stabilized in accordance with the present invention are prepared by emulsifying the monomers or mixtures of monomers in from about an equal to about a twofold quantity of water using, as the emulsifier, water-soluble soaps such as alkali metal or ammonium salts of oleic, stearic or palmitic acids or mixtures of fatty acids such as are obtained by selective hydrogenation of the mixture of fatty acids obtained from tallow. Other emulsifying agents which may be used include such synthetic surface active agents as salts of alkylated benzene- and naphthalene sulfonic acids, fatty alcohol sulfates, salts of aliphatic or olefinic sulfonic acids and also acid addition salts of high molecular weight alkyl amines such as dodecyl amine hydrochloride or acetate. The amount of emulsifier used is ordinarily about 0.5 to about 5 weight per cent based on the reactants. A polymerization catalyst such as benzoyl peroxide, hydrogen peroxide and alkali metal or ammonium perborates or persulfates or the like is provided in the reaction mixture in amounts of about 0.05 to about 0.6 weight per cent based on the reactants. It is ordinarily preferred to provide a suitable polymerization modifier or promoter such as dialkyl xanthogen disulfides or aliphatic mercaptans containing at least six carbon atoms per molecule such as hexyl, octyl, decyl, dodecyl, Lorol or benzyl mercaptans in the reaction mixture in amounts of between about 0.2 to about 1.0 weight per cent based upon the reactants present. The reaction mixture is maintained at the desired temperature of between about 15° C. and about 65° C. for a length of time sufficient to convert a major proportion, generally about 75% of the monomers to a solid, high molecular weight polymerizate of the desired properties. Ordinarily about 12 to about 18 hours are required to reach this conversion. The proportions of materials used, temperature, time of reaction, etc, are well known or understood by the art and form no part of the present invention.

When the desired conversion level is reached, a polymer stabilizer or short-stop mixture of the type described above is added to the latex. The amount of stabilizer added is ordinarily about 0.1% to about 1% although larger amounts such as up to about 6–7% may be used. The latex may then be stripped of unreacted monomers by subjecting it to steam distillation, preferably under reduced pressure whereupon the latex may be stored as such or subjected to creaming or coagulation.

The particular advantages of the mixtures of hydroxylamine and dialkyl derivatives of o- and p-cresols as short-stops for synthetic latices is illustrated by the following examples:

EXAMPLE 1

Quart size King No. 1 siphon bottles were used as the reactors for the preparation of butadiene-styrene copolymers. The materials charged to the reactors were as follows:

|  | Grams |
|---|---|
| Butadiene | 144 |
| Styrene | 56 |
| Dodecyl mercaptan | 0.76 |
| Potassium persulfate | 0.60 |
| Tallow acid soap | 10.0 |
| Water | 180.0 |

The polymerizations were carried out at 40 or 50° C. in a constant temperature vat where the bottles were rotated on a 36" diameter wheel at a rate of 16 R. P. M.

Short stops were added to the reaction mixtures after the desired conversion had been attained, as water or benzene solutions or as dispersions. These additions were made by a technique involving the use of a hypodermic syringe and needle. In this case a 10 ml. B-D Yale-Lok syringe fitted with a 1 inch, 20 gauge stainless steel needle was used. In all cases the concentration of short stop was adjusted so that 5 ml. of solution could be added to the reaction mixture.

Monomer conversions were determined by a hypodermic sampling technique. In this case a 5 ml. syringe fitted with stops for the plunger was used to withdraw samples of latex from the reactors just after short-stop addition and again after the short-stopped reaction mixture had been returned to the vat for an additional 17 hours at 50° C. (total of 24 hours' reaction time) or 24 hours at 40° C. (total of 40 hours' reaction time.) In both instances the reactors were shaken vigorously before sampling in order to obtain homogeneous portions of latex. The syringe was fitted with a one way stopcock so that the latex could be transferred to a tared vessel (containing approximately 0.002 gm. of hydroquinone) for weighing and subsequent evaporation to dryness for solids and conversion determination. A per cent solids-per cent conversion relation was established by sampling reactions in the above manner and coagulating and drying the remaining latex for dry rubber content. By this technique solids from a single reactor were reproducible to at least ±0.2% and the conversions to ±1.0%.

The results obtained are tabulated in Table I set out below:

*Table I*

| Test Material | Conc. (percent on Monomers) | Polym. Temp., °C. | Percent Conv. at S. S. Addition | Additional Hrs. at Polym. Temp. | Final Conv. | Percent Conv. Increase |
|---|---|---|---|---|---|---|
| Hydroxylamine | 0.05 | 50 | 48.8 | 17 | 92.0 | 43.2 |
| Do | 0.10 | 50 | 52.5 | 17 | 65.3 | 12.8 |
| Do | 0.20 | 50 | 48.5 | 17 | 51.0 | 2.5 |
| Do | 0.30 | 50 | 47.7 | 17 | 48.8 | 1.1 |
| 2,6 di-t-butyl-4-methyl-phenol | 0.3 | 50 | 47.2 | 17 | 92.5 | 35.3 |
| Do | 0.2 | 50 | 47.9 | 17 | 88.0 | 38.3 |
| Do | 0.1 | 50 | 47.9 | 17 | 86.2 | 40.1 |
| Do | 0.2 | 50 | 77.6 | 12 | 95.5 | 17.9 |
| Do | 0.2 | 40 | 45.4 | 24 | 77.3 | 31.9 |
| 2,4,6 trimethylphenol (Resitol) | 0.3 | 50 | 52.2 | 17 | 67.2 | 15.0 |
| Do | 0.2 | 50 | 50.2 | 17 | 71.0 | 20.8 |
| Do | 0.2 | 50 | 80.5 | 12 | 80.5 | 0.0 |
| Do | 0.2 | 40 | 45.1 | 24 | 48.7 | 3.6 |
| 2,4 dimethyl-6-t-butyl-phenol | 0.3 | 50 | 48.0 | 17 | 71.5 | 23.5 |
| Do | 0.2 | 50 | 51.4 | 17 | 80.8 | 29.4 |
| Do | 0.2 | 50 | 77.6 | 12 | 86.8 | 9.2 |
| Do | 0.2 | 40 | 46.8 | 24 | 52.2 | 3.4 |
| 2,3 dimethyl-6-t-butyl-phenol | 0.3 | 50 | 53.0 | 17 | 82.8 | 29.8 |
| Do | 0.2 | 50 | 47.5 | 17 | 81.2 | 33.7 |
| Do | 0.2 | 50 | 78.0 | 12 | 92.5 | 14.5 |
| Do | 0.2 | 40 | 46.2 | 24 | 62.7 | 16.5 |
| 2,t-butyl-4 methoxyphenol | 0.15 | 50 | 44.2 | 17 | 74.7 | 30.5 |
| Do | 0.10 | 50 | 39.6 | 17 | 83.0 | 43.4 |
| 2,t-butyl-4-methyl phenol | 0.15 | 50 | 47.7 | 17 | 98.0 | 50.3 |
| Do | 0.10 | 50 | 42.5 | 17 | 93.0 | 50.5 |
| 2-n-butyl-4-methol phenol | 0.15 | 50 | 45.8 | 17 | 94.3 | 48.5 |
| Do | 0.10 | 50 | 41.0 | 17 | 92.8 | 51.8 |
| 2,6 di-t-butyl-4-methyl phenol / Hydroxylamine | 0.10 / 0.10 | 50 | 54.2 | 17 | 65 | 10.8 |
| 2,6 di-t-butyl-4-methyl phenol / Hydroxylamine | 0.20 / 0.10 | 50 | 54.1 | 17 | 64.5 | 10.1 |
| 2,4 dimethyl-6-t-butyl phenol / Hydroxylamine | 0.10 / 0.10 | 50 | 50.2 | 17 | 57.7 | 7.5 |
| 2,4 dimethyl-6-t-butyl phenol / Hydroxylamine | 0.20 / 0.10 | 50 | 54.6 | 17 | 60.0 | 5.4 |
| Mesitol / Hydroxylamine | 0.10 / 0.10 | 50 | 49.0 | 17 | 53.0 | 4.0 |
| Mesitol / Hydroxylamine | 0.20 / 0.10 | 50 | 48.8 | 17 | 51.2 | 2.4 |
| 2,3 dimethyl-6-t-butyl phenol / Hydroxylamine | 0.10 / 0.10 | 50 | 51.0 | 17 | 57.0 | 6.0 |
| 2,3 dimethyl-6-t-butyl phenol / Hydroxylamine | 0.20 / 0.10 | 50 | 53.2 | 17 | 59.0 | 5.8 |

The above results show that hydroxylamine is highly effective as a short-stop only if used in amounts of at least 0.2% based upon the monomers and that dialkyl phenols and alkoxyalkyl phenols are substantially ineffective as short-stops for emulsion polymer latices while the trialkyl phenols are of unsatisfactory activity when added as short-stops to 50% conversion latices at about 50° C. but are somewhat more effective as short-stops in higher conversion latices and at lower temperatures. Surprisingly, however, mixtures of 0.1 to 0.2% of trialkyl phenols and about 0.1% of hydroxylamine exhibited a considerable activity as short-stopping agents. Accordingly, by using the trialkylphenols which per se are not particularly effective as short-stops in conjunction with hydroxylamine, the amount of the latter may be reduced to substantially half that required when used alone as the short-stop.

EXAMPLE 2

A butadiene-acrylonitrile latex containing about 25% of rubber solids and 2½% of sodium oleate based on the water, was prepared by copolymerizing butadiene and acrylonitrile in approximately a 3 to 1 molar ratio, the polymerization being carried to approximately a 75% conversion of monomers to polymers. This latex was divided into several smaller batches. Each batch was short-stopped in a different manner, then stripped of monomers by heating for 2 hours at 60° C. whereupon 2.0% of phenyl beta naphthylamine was added to each batch, the latex coagulated with brine, slurry washed and oven dried for 10 hours at 175° F. The dry coagulum was analyzed for gel (the benzene insoluble portion of the polymer), a low value for percent gel signifying effective short-stopping and stabilizing up to the point of anti-oxidant addition. Mooney plasticity measurements were also made on the dry polymers, the lower values indicating better latex stabilization. The data obtained are tabulated below:

| Short Stop (Per Cent on Polymer) | Per Cent Gel In Dry Polymer | Mooney Viscosity at 212° F. | | |
|---|---|---|---|---|
| | | 2' | 4' | 15' |
| None | 65 | 122 | 125 | 117 |
| 0.2 Hydroquinone | 0 | 82 | 84 | 79 |
| 0.2% Hydroxylamine.HCl | 0 | 81 | 85 | 77 |
| 0.2% 2,6-di-t-butyl-4-methyl phenol | 0 | 85 | 98 | 100 |
| 0.1% 2,6-di-t-butyl-4-methyl phenol 0.1% Hydroxylamine.HCl | 0 | 82 | 86 | 79 |

These data show that 2,6-di-t-butyl-4-methyl phenol is inferior as a short-stopper for butadiene-acrylonitrile type latices but that by mixing 0.1% of that phenol with 0.1% of hydroxylamine·HCl it is possible to get the same short-stopping effect as is obtained with 0.2% of hydroxylamine·HCl or 0.2% of hydroquinone.

EXAMPLE 3

A butadiene-acrylonitrile type latex of 75% monomer conversion was prepared as described in Example 2. The fresh latex was short-stopped with 0.2% of hydroxylamine·HCl and then stripped by heating for 3 hours at 60° C. This stripped latex was divided into four equal portions for aging tests at room temperature and at 50° C., the accelerated aging tests being carried out in closed pressure-type bottles. Portions of the above latex were aged without further addition of stabilizing agent at room temperature and at 50° C. The other portions were subjected to the same aging tests after the addition of 0.2% of 2,6-di-t-butyl-4-methyl phenol. After varying periods of aging, latex samples were drawn for gel analyses of the isolated dry polymer. In all cases 2% of phenyl beta naphthylamine was added to the latex before coagulation to insure against gel formation during the drying of the polymer. An increase in the gel content of the polymer is an indication that cross-linking of polymer chains has occurred either by the action of active polymer segments or by oxidative processes. The data obtained are as follows:

| Stabilizer | Per Cent Gel in Dry Rubber | | | | |
|---|---|---|---|---|---|
| | After Aging at Room Temp. | | | After Aging at 50° C. | |
| | 0 days | 48 days | 300 days | 0 days | 11 days |
| 0.2% Hydroxylamine.HCl | 0 | 2.5 | 75 | 0 | 27 |
| 0.2% Hydroxylamine.HCl 0.2% 2,6-di-t-butyl-4-methyl phenol | 0 | 0 | 39 | 0 | 0 |

These data show that although the water-soluble hydroxylamine·HCl is an effective short-stopping agent it is not effective in preventing gel formation during prolonged storage but that a mixture of hydroxylamine·HCl with a trialkylated phenol is considerably more effective as a stabilizer for butadiene-acrylonitrile type latices during prolonged storage.

The foregoing description contains a limited number of embodiments of the present invention. It will be understood, however, that the foregoing examples are merely illustrative of the present invention and that the latter is not limited to the specific conditions described since numerous variations are possible without departing from the scope of our invention as defined in the following claims.

What we claim and desire to secure by Letters Patent is:

1. A method of stabilizing against further polymerization a synthetic rubber latex prepared by polymerizing in aqueous emulsion a conjugated diolefin having from 4 to 6 carbon atoms, which method comprises adding to the latex about 0.1 to 0.2% of a trialkyl phenol having the formula

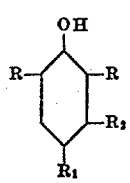

wherein each R stands for an alkyl group having from 1 to 5 carbon atoms and $R_1$ stands for methyl when $R_2$ stands for hydrogen and $R_1$ stands for hydrogen when $R_2$ stands for methyl and, in combination therewith about 0.10% of a member of the group consisting of hydroxylamine and hydroxylamine hydrochloride, the percentage values being based on the amount of monomers.

2. A method of stabilizing against further polymerization a synthetic rubber latex prepared by polymerizing in aqueous emulsion a conjugated diolefin having from 4 to 6 carbon atoms and an ethylenically unsaturated comonomer capable of copolymerizing with the said diolefin, which method comprises adding to the latex about 0.1 to 0.2% of a trialkyl phenol having the formula

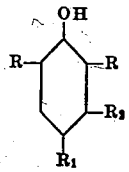

wherein each R stands for an alkyl group having from 1 to 5 carbon atoms and $R_1$ stands for methyl when $R_2$ stands for hydrogen and $R_1$ stands for hydrogen when $R_2$ stands for methyl and about 0.10% of a member of the group consisting of hydroxylamine and hydroxylamine hydrochloride, the percentage values being based on the amount of monomers.

3. A method of stabilizing against further polymerization a synthetic rubber latex prepared by copolymerizing butadiene-1,3 and acrylonitrile in aqueous emulsion, which method comprises adding to the latex about 0.1 to 0.2% of a trialkyl phenol having the formula

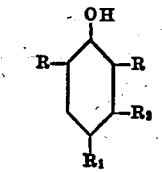

wherein each R stands for an alkyl group having from 1 to 5 carbon atoms and $R_1$ stands for methyl when $R_2$ stands for hydrogen and $R_1$ stands for hydrogen when $R_2$ stands for methyl and about 0.10% of hydroxylamine, the percentage values being based on the amount of monomers used for the polymerization.

4. The method of stabilizing against further polymerization a synthetic rubber latex prepared by copolymerizing in aqueous emulsion a major proportion of butadiene-1,3 and a minor proportion of acrylonitrile which comprises dispersing therein 0.1 to 0.2 percent based on monomers of 2,6-di-t-butyl-4-methyl phenol and 0.1 percent based on monomers of hydroxylamine hydrochloride.

5. A method according to claim 2 wherein the unsaturated comonomer is styrene.

6. The process as defined in claim 1 wherein the trialkyl phenol is 2,4,6-trimethyl phenol.

7. The process as defined in claim 2 wherein the trialkyl phenol is 2,4,6-trimethyl phenol.

8. The process as defined in claim 3 wherein the trialkyl phenol is 2,4,6-trimethyl phenol.

9. The process as defined in claim 5 wherein the trialkyl phenol is 2,4,6-trimethyl phenol.

10. The process as defined in claim 1 wherein the trialkyl phenol is 2,4-dimethyl-6-t-butyl phenol.

11. The process as defined in claim 2 wherein the trialkyl phenol is 2,4-dimethyl-6-t-butyl phenol.

12. The process as defined in claim 1 wherein the trialkyl phenol is 2,6-di-t-butyl-4-methyl phenol.

13. The process as defined in claim 2 wherein the trialkyl phenol is 2,6-di-t-butyl-4-methyl phenol.

14. The process as defined in claim 5 wherein the trialkyl phenol is 2,6-di-t-butyl-4-methyl phenol.

FRED W. BANES.
ERVING ARUNDALE.

REFERENCES CITED

The following references are of record in the file of this patent:

UNITED STATES PATENTS

| Number | Name | Date |
| --- | --- | --- |
| 2,356,929 | Hart | Aug. 29, 1944 |
| 2,444,801 | Arundale | July 6, 1948 |

OTHER REFERENCES

"Du Pont Rubber Chemicals," Report No. 43-1 page 121 (Feb. 23, 1943).

White et al.: Ind. Eng. Chem., 37, 770-775 (Aug. 1945).